(12) United States Patent
Edwards et al.

(10) Patent No.: US 9,032,755 B2
(45) Date of Patent: May 19, 2015

(54) SOLAR-ABSORPTION HYBRID MODULAR COOLING APPARATUS

(75) Inventors: Robert Eaton Edwards, Peterborough (GB); Michael Graham Reid, Cambridgeshire (GB)

(73) Assignee: SOLAR POLAR LIMITED, Cambridgeshire (GB)

( * ) Notice: Subject to any disclaimer, the term of this patent is extended or adjusted under 35 U.S.C. 154(b) by 713 days.

(21) Appl. No.: 12/998,156

(22) PCT Filed: Sep. 23, 2009

(86) PCT No.: PCT/GB2009/002274
§ 371 (c)(1), (2), (4) Date: Mar. 23, 2011

(87) PCT Pub. No.: WO2010/034992
PCT Pub. Date: Apr. 1, 2010

(65) Prior Publication Data
US 2011/0167854 A1    Jul. 14, 2011

(30) Foreign Application Priority Data

Sep. 23, 2008 (GB) .................................. 0817410.4

(51) Int. Cl.
*F25B 17/02* (2006.01)
*F25B 17/00* (2006.01)
(Continued)

(52) U.S. Cl.
CPC ............... *F25B 15/10* (2013.01); *F24F 3/1417* (2013.01); *F24F 5/0046* (2013.01); *F24F 2005/0064* (2013.01); *F25B 27/007* (2013.01); *F25B 2315/007* (2013.01); *Y02B 10/20* (2013.01); *Y02B 10/24* (2013.01); *Y02B 30/62* (2013.01)

(58) Field of Classification Search
CPC ........ Y02B 30/62; Y02B 30/64; F25B 15/10; F25B 17/00–17/12; F24F 3/1417
USPC .......................................... 62/235.1, 476, 478
See application file for complete search history.

(56) References Cited

U.S. PATENT DOCUMENTS 2,030,350 A * 2/1936 Bremser .......................... 62/148
2,943,868 A   7/1960 Hanback
(Continued)

FOREIGN PATENT DOCUMENTS

CN    1341832    3/2002
DE    197 40 066    3/1999
(Continued)

OTHER PUBLICATIONS

S.N. Mumah, "Selection of heat storage materials for ammonia-water and lithium bromide solar-powered absorption heat pump systems" *International Journal of Sustainable Energy*, vol. 27, No. 2, Jun. 2008, pp. 81-93.

(Continued)

*Primary Examiner* — Stephen M. Gravini
*Assistant Examiner* — Filip Zec
(74) *Attorney, Agent, or Firm* — Nixon & Vanderhye, PC

(57) ABSTRACT

The invention provides cooling apparatus comprising: a solar heat collection means (2); two or more absorption refrigeration modules (1), each module being arranged to receive heat from the heat collection means and to re-circulate refrigerant through an evaporator (16); and means for putting a fluid to be cooled into thermal contact with each of the evaporators.

11 Claims, 3 Drawing Sheets

(51) Int. Cl.
  *F25B 27/00*  (2006.01)
  *F25B 15/10*  (2006.01)
  *F24F 3/14*  (2006.01)
  *F24F 5/00*  (2006.01)

(56) References Cited

U.S. PATENT DOCUMENTS

| | | | | |
|---|---|---|---|---|
| 4,199,952 | A * | 4/1980 | Berg | 62/143 |
| 4,223,535 | A * | 9/1980 | Kumm | 62/235.1 |
| 4,257,477 | A * | 3/1981 | Maloney | 165/48.2 |
| 4,280,483 | A | 7/1981 | Schaffer | |
| 4,362,025 | A | 12/1982 | Theakston | |
| 4,429,545 | A | 2/1984 | Steinberg | |
| 4,441,484 | A * | 4/1984 | Greiner | 126/630 |
| 4,545,364 | A * | 10/1985 | Maloney | 126/618 |
| 4,615,381 | A * | 10/1986 | Maloney | 165/48.2 |
| 4,744,224 | A | 5/1988 | Erickson | |
| 6,212,902 | B1 * | 4/2001 | Leistner | 62/497 |
| 6,253,563 | B1 | 7/2001 | Ewert et al. | |
| 6,397,625 | B1 * | 6/2002 | Kunze | 62/476 |
| 7,201,017 | B2 * | 4/2007 | Barth et al. | 62/476 |
| 2002/0170311 | A1 * | 11/2002 | Pai et al. | 62/490 |
| 2005/0050913 | A1 | 3/2005 | Barth et al. | |
| 2008/0178617 | A1 * | 7/2008 | Jones et al. | 62/119 |

FOREIGN PATENT DOCUMENTS

| | | |
|---|---|---|
| DE | 100 28 543 | 12/2001 |
| DE | 102 48 557 | 5/2004 |
| DE | 103 25 933 | 12/2004 |
| GB | 2 083 901 | 3/1982 |
| GB | 2 463 704 | 3/2010 |
| GB | 2 463 705 | 3/2010 |
| WO | WO 01/90663 | 11/2001 |
| WO | WO 2006/100047 | 9/2006 |
| WO | WO 2006/128236 | 12/2006 |
| WO | WO 2007/063119 | 6/2007 |

OTHER PUBLICATIONS

UK Search Report dated Jan. 14, 2009 for GB 0817410.4.
UK Search Report dated Jan. 13, 2009 for GB 0817409.6.
International Search Report dated Dec. 9, 2009 for PCT/GB2009/002272.
International Search Report dated Dec. 9, 2009 for PCT/GB2009/002274.
International Preliminary Report on Patentability and Written Opinion of the International Searching Authority dated Mar. 29, 2011 for PCT/GB2009/002274.

* cited by examiner

SOLAR-ABSORPTION HYBRID MODULAR COOLING APPARATUS

This application is the U.S. national phase of International Application No. PCT/GB2009/002274, filed 23 Sep. 2009, which designated the U.S. and claims priority to GB Application No. 0817410.4, filed 23 Sep. 2008, the entire contents of each of which are hereby incorporated by reference.

FILED OF THE INVENTION

This invention relates to a cooler, particularly an air cooler, and is applicable to the cooling of air in rooms e.g. as part of an air conditioning system; or the cooling of air in a confined space such as a refrigerator.

BACKGROUND TO THE INVENTION

Many parts of the world that suffer high climatic temperatures, where refrigeration and air conditioning are therefore important, are too remote to have a mains electricity supply. Solar power has the potential to resolve this problem but most solar powered refrigeration systems have the problem that they rely on moving mechanical compressors and other parts that are liable to failure. This makes the existing solar powered systems unsuitable for prolonged use in regions where there is no facility for repair and maintenance. Another problem is that most existing designs are electrically driven and employ photoelectric panels to generate the electricity. Unless provided with electric storage facilities, such designs are unable to function during periods when there is no sunlight. Compounding these problems is often a lack of local skilled maintenance personnel.

SUMMARY OF THE INVENTION

The invention is defined in the appended independent claim, to which reference should now be made.

The invention provides cooling apparatus comprising: a solar heat collection means; two or more absorption refrigeration modules, each module being arranged to receive heat from the heat collection means and to re-circulate refrigerant through an evaporator; and means for putting a fluid to be cooled into thermal contact with each of the evaporators.

Each module preferably incorporates its own individual evaporator. A housing for this, defining a path for air to be cooled, can conveniently be formed by partition walls within a main outer casing of the module. In one particularly effective design, the outer casing of each module is formed with lines of weakness defining knock-out areas allowing interconnection between evaporator housings of adjoining modules.

By employing a modular construction it becomes possible to obtain any desired cooling power by employing any appropriate number of modules. Furthermore, by using absorption refrigeration principles the invention makes it possible to eliminate the need for moving parts, allowing the system to function for many years without maintenance.

1. Preferably each module has: a generator containing a solution of refrigerant in a liquid, the generator being arranged to receive heat from the heat collector and to cause evaporation of the refrigerant,
2. a bubble pump for pumping the liquid from the generator to an absorber,
3. a condenser arranged to receive gaseous refrigerant from the generator and to condense the same,
4. an evaporator,
5. means for passing liquid refrigerant from the condenser to the evaporator, and
6. absorbing means for receiving gaseous refrigerant from the evaporator, absorbing it into the liquid from the bubble pump and returning the liquid to the generator.

Bubble pumps rely on surface tension to operate and are for that reason not scalable to larger sizes. If the diameter of the tube of the bubble pump exceeds around 12 mm, then the meniscus will be prone to collapse. This limits the amount of cooling a bubble pump driven system can deliver. The invention makes it possible to provide any desired amount of cooling by using a plurality of modules.

The modular configuration proposed by the invention also gives economies of manufacturing and distribution costs. This is because only one module design is required, which can be produced in large quantities and assembled in banks of different sizes depending on the power requirements of a particular situation. Typically a residential property might require 8 to 15 modules for air conditioning purposes whilst a refrigerator might require just one module.

It would be possible for the generator to be included within, or in direct contact with, the solar collector but this is not preferred because it would be difficult, without recourse to powered fans or the like, to ensure that heat is efficiently transferred to the generator. It is therefore proposed that a heat pipe be included having its hot end within the solar collector. The cold end of the heat pipe and the generator can then be arranged in thermal contact with each other. In a preferred arrangement the thermal contact is achieved by a phase-change heat storage medium, the cold end of the heat pipe and the generator preferably being in close thermal contact with (but preferably not immersed in) this medium. Heat stored in the phase change heat store is able to drive the refrigeration system into the evening after sunset.

Each module preferably has a casing which encloses the components (1) to (6) listed above and includes means for attaching the modules rigidly together. The attachment means is preferably in the form of clips or other fastening devices that permit easy assembly. It is best if the casing has parallel sides that are flat or otherwise shaped so as to conform to each other so that the sides of adjacent modules lie against each other when attached.

The invention can be used for cooling air in an air conditioning system, where there is normally a need for continued operation into the evening but not throughout the night. When the system is for use in air conditioning, the modules are preferably installed in a roof space or, for a flat-roofed building, on top of the roof.

The invention is also applicable to refrigeration systems for storage of food or medicines. In such a system, since the space to be cooled is relatively small, the stored latent heat of the phase change material may be sufficient to last throughout the night or at least for sufficient time to ensure that the temperature of air within the relevant space does not rise unacceptably. When for use as a refrigerator, the modules are preferably mounted on an outside panel, e.g. a panel defining the top surface of the cabinet.

The invention is not limited to environments where it is used for cooling air. It could be used for cooling liquids such as drinks; and fluids that require cooling in industrial processes.

BRIEF DESCRIPTION OF THE DRAWINGS

One way in which the invention may be performed will now be described by way of example with reference to the accompanying drawings in which: —

DETAILED DESCRIPTION

Figure 1:
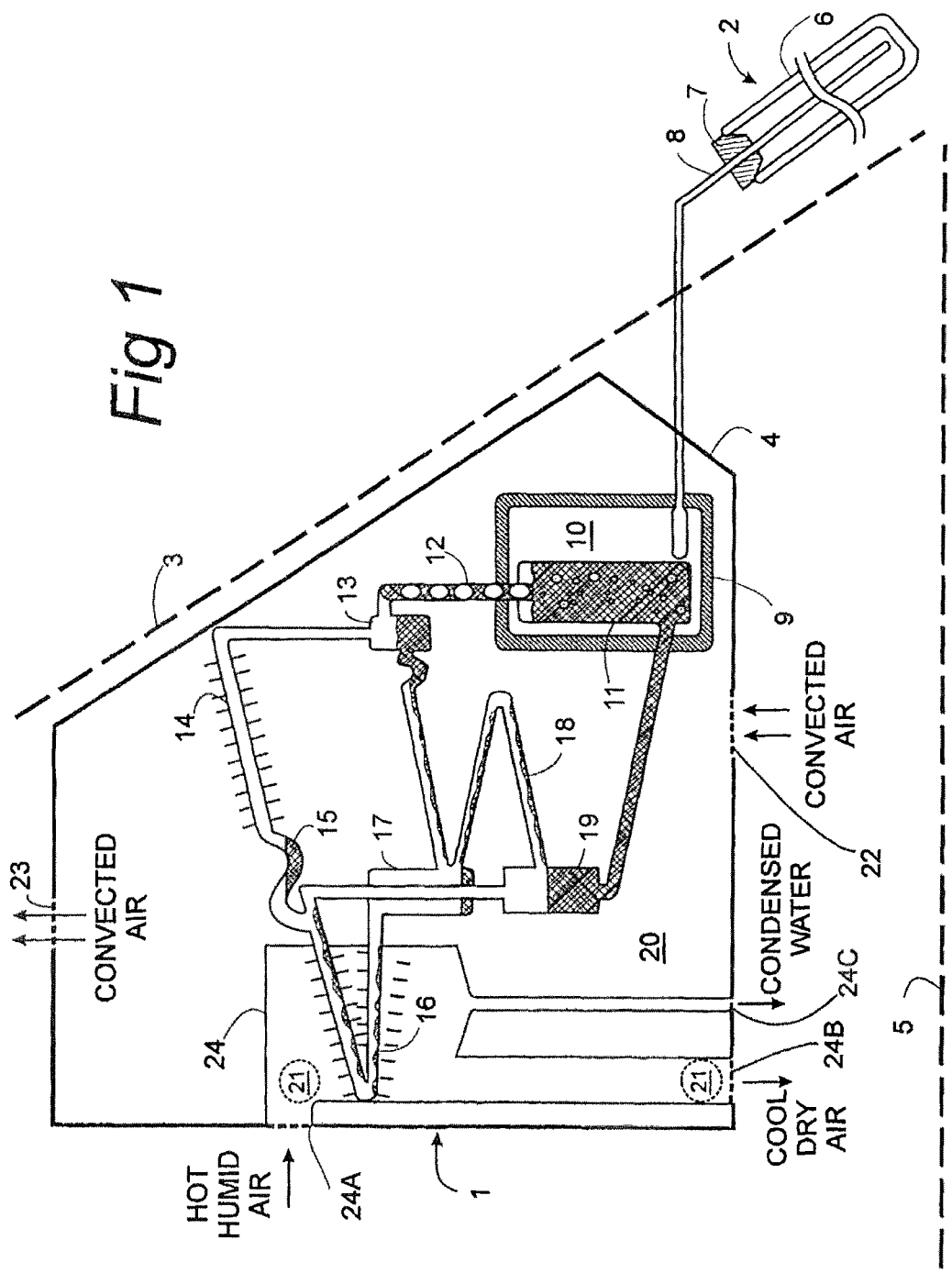
FIG. 1 is a schematic illustration of the components of an air conditioning system constructed in accordance with the invention.

Referring firstly to FIG. 1; there is shown a refrigeration module 1 comprising a solar collector 2 exposed to sunlight on the outside of a roof 3 of a building and a housing 4 mounted inside a roof space defined between the roof 3 and a ceiling 5. The solar collector 2 is formed by three evacuated tubes 6 (only one shown for simplicity of description) each having a seal 7. Arrangements having a different number of tubes 6, e.g. two or four would also be suitable.

The module 1 also includes heat pipes 8, one for each collector 2, containing, in this particular example, water as its operating fluid. The pressure inside the heat pipe varies so that it is always at the saturation pressure for any given temperature. In this example, the heat pipe reaches around 220° C., at which point the pressure inside the heat pipe is well above ambient pressure. The hot end of each heat pipe is located within the heat collector tube and it passes through the seal 7 and through the roof 3 to its cold end within the housing 4.

A heat store is formed by an insulated vessel 9 containing a phase-change material 10. In this example the phase change material is a eutectic mixture of sodium nitrate and lithium nitrate, having a melting point of 195° C. Other materials having melting points in the range of 190° C. and 220° C. would also be suitable for use with an ammonia solution refrigerant. The heat pipe 8 passes through the wall of the heat store vessel 9 so that its colder end is in close thermal contact with the phase-change material 10.

A generator 11, containing strong ammonia solution in water, is in close thermal contact with the phase-change material 10 and is connected via a bubble pump 12 and collector 13 to a condenser 14, a trap 15, an evaporator 16, a junction 17, a heat exchanger 18 and a reservoir 19.

Ammonia is the refrigerant and has a boiling point of around 190° C. For optimal operation the phase change material should have a melting point above, but within 20° C. of, the boiling point of the refrigerant.

The housing 4 is formed from pressed metal sheet and defines an air duct 20. The evaporator 16 is located in a heat exchange chamber 24 where hot air drawn through port 24A is cooled and flows by convection down through port 24B into a living area of the building. The heat exchange chamber is defined between side walls of the housing 4 and partition walls as shown in FIG. 1. These partition walls extend downwardly towards an exit 24B for cool dry air and an exit port 24C for condensed water. The latter can be drained away via a flexible pipe (not shown).

The housing is formed with holes 22 and 23 and with circular lines of weakness defining disc shapes 21, 24A and 24B that can be pushed out to define holes as required. The shapes 21 are formed on opposite parallel vertical faces of the housing 4 in the region of the heat exchange chamber 24. In a single module system just the shapes 24A and 24B are pushed out to allow entry of air to be cooled into chamber 24 exit of cooled air from it. Where additional modules are connected to the first module, the shapes 21 are removed on the contiguous faces of all adjoining modules so that the heat exchange chambers 24 of all modules are connected, while sharing a common entry and exit 24A and 24B provided by just one of them.

It is necessary to heat the generator 11 to a temperature of about 230° C. to start the refrigeration cycle but, once started, it will continue to operate unless the temperature of the generator 11 drops to about 190° C. or below. Operation is as follows.

Sunlight during the day heats the hot, lower, end of the heat pipe 8. The pipe 8 contains water, which acts as a refrigerant. The resulting water vapour rises to the upper, relatively cold, end of the heat pipe, where it condenses, giving up its heat to the phase change material 10.

The temperature of the phase change material increases until it reaches its phase change temperature of 200° C. at which point it remains at that temperature whilst continuing to absorb heat from the heat pipe as it changes phase. When the phase change material has become entirely liquid, its temperature continues to rise again until it reaches 230° C., the start-up temperature of the refrigeration system. The refrigeration system then starts to operate and the temperature of the phase change material drops, say to 210° C., as the heat is drawn from it to drive the refrigeration system.

The refrigeration cycle itself is entirely conventional in operating principles as follows.

The generator 11 contains a strong solution of ammonia in water. Heat from the phase change material boils the solution, releasing bubbles of ammonia gas and resulting in weakening of the solution. The bubbles raise the weakened solution to the separator 13 by the action of the bubble pump 12.

In the separator 13, the ammonia gas is separated from the weak ammonia solution and travels to the condenser 14 where heat is released to the air in duct 20 causing the ammonia gas to condense as liquid ammonia. The latter passes through trap 15 into the evaporator where it is exposed to hydrogen gas. The hydrogen environment lowers the vapour pressure of the liquid ammonia sufficiently to cause the ammonia to evaporate, extracting heat from air in the duct 24. This produces cool, dehumidified air for air conditioning purposes and pure water which exits from port 24C and can be collected for use.

The ammonia gas and hydrogen mixture passes to the mixer 17 where the ammonia dissolves in the weakened solution from the separator 13, producing a more concentrated solution which flows into the heat exchanger 18 where it loses its heat to air within the duct 20. The concentrated solution then passes into the reservoir 19 and thence to the generator 11 whereupon the cycle is complete.

When the power of the sun becomes insufficient to retain the phase change material above 200° C., the latter starts to solidify and the latent heat of fusion maintains the generator 11 at a sufficient temperature to sustain the refrigeration cycle. In this way the refrigeration mechanism can remain operational throughout the night or at least a sufficient part of it to ensure that cooling is maintained until the ambient temperature drops to an acceptable level. A larger volume of phase change material may also be provided in the space below the evaporator 16. This phase change material will solidify when the system is providing cooling during the day but will melt at night, to provide further cooling at night. This can provide cooling for long periods. Indeed a small medicine refrigerator can store five days worth of cooling in this way.

Figure 2:
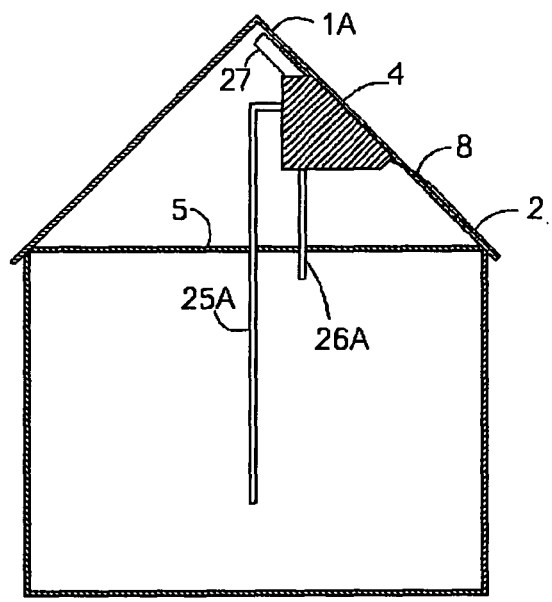
FIG. 2 shows a vertical cross-section through a house having a pitched roof and fitted with the system of FIG. 1.

FIG. 2 shows how the various parts that have been described are installed in a building having a pitched roof 3.

From this drawing it can be seen that the solar collector 2 lies against the roof surface, on the outside of the building whilst the housings 4 and their contents are in the roof space isolated from the main living area of the building (i.e. the area to be cooled). A chimney 27 connects to the port 23 (or each of the ports where there are multiple modules) to provide improved draft of cooling air.

Figure 3:
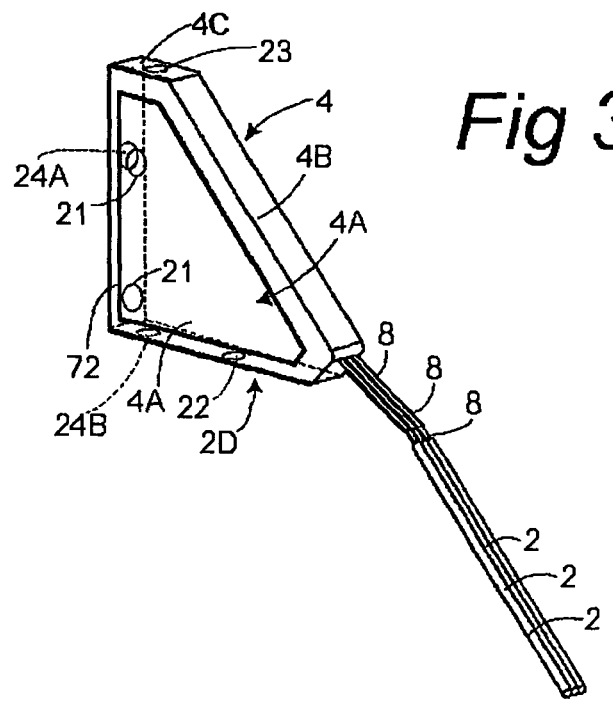
FIG. 3 is a perspective view of a solar collector and a module into which most of the other components shown in FIG. 1 are contained.

FIG. 3 shows how the housing 4 is formed with parallel flat faces 4A, a sloping edge 4B arranged parallel to the tubes 2 and to the roof surface so that it can be mounted on the inner face of the roof; a short horizontal top edge 4C formed with vent hole 23 and adapted to be connected to a chimney duct (not shown) and an open relatively long, bottom horizontal edge 2D formed with vent hole 22. The faces 4A have gaskets 72 which provide a seal between adjoining units when they are connected together in the manner described below to give the required power depending on the installation.

Figure 4:
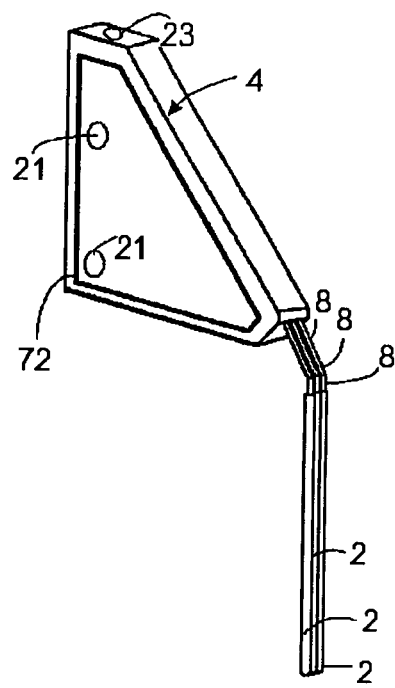
FIG. 4 shows a variation of the module design for use on a flat roof or on a rectilinear cabinet for use as a refrigerator.
Figure 5:
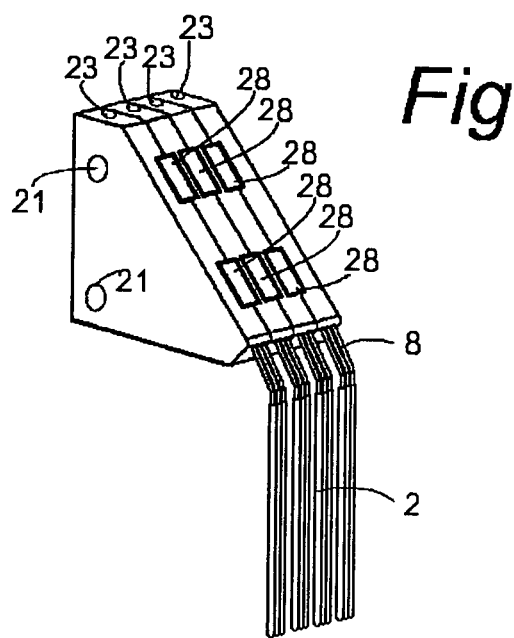
FIG. 5 shows a perspective view of a group of similar modules connected in parallel.

FIG. 4 shows a variation where the tubes 2 are angled so as to be perpendicular to the bottom faces 2D of the modules to permit mounting on a wall. FIG. 5 shows a modular construction comprising a stack of housings connected physically together, face to face by clips 28.

A system as shown in FIG. 4 or 5 can readily be adapted for use as a refrigerator instead of an air conditioning system. In such an arrangement, one or more modules would be mounted on an outer surface (e.g. the top surface) of an insulated cabinet with pipes analogous to those shown at 25A and 26A on FIG. 2 extending through that surface into the cabinet interior so as to circulate and cool air in the cabinet. In this arrangement it is envisaged that the cabinet would normally be located inside a building with the tubes 6 projecting through the outside wall and fixed on and parallel to the outside of the wall to collect solar heat.

It is emphasised that the particular systems that have been described and illustrated are just examples of an unlimited number of variations that are possible within the scope of the invention as defined by the accompanying claims.

The invention claimed is:

1. Cooling apparatus comprising:
   a solar heat collection means;
   two or more absorption refrigeration modules, each module being arranged to receive heat from the heat collection means and to re-circulate refrigerant through an evaporator; and
   means for putting a fluid to be cooled into thermal contact with each of the evaporators, each module has:

a. a generator containing a solution of refrigerant in a liquid, the generator configured to receive heat from the heat collector and to cause evaporation of the refrigerant;
   b. only a single bubble pump configured to pump the liquid from the generator to an absorber;
   c. a condenser configured to receive gaseous refrigerant from the generator and to condense the same;
   d. an evaporator;
   e. means for passing liquid refrigerant from the condenser to the evaporator;
   f. said absorber is configured to receive gaseous refrigerant from the evaporator, absorbing the received gaseous refrigerant from the evaporator into the liquid from the bubble pump and returning the liquid to the generator; and
   g. a casing enclosing elements a-f and further including means for attaching said modules together.

2. Cooling apparatus according to claim 1, in which each evaporator is arranged to cool air in an air conditioning system.

3. Cooling apparatus according to claim 1, in which each evaporator is arranged to cool air within an enclosed refrigerator cabinet.

4. Cooling apparatus according to claim 1, comprising a heat pipe for each module, the heat pipe configured to transfer heat from the solar heat collection means to a heat store configured to provide heat to said generator.

5. Cooling apparatus according to claim 4 in which each module includes a solar heat collector.

6. Cooling apparatus according to claim 1 in which the casing defines a path for cooling air.

7. Cooling apparatus according to claim 6 including ports by which interior spaces within the casings are connected together.

8. Cooling apparatus according to claim 7 in which each casing is formed by sheet material having lines of weakness whereby areas can be pressed out to form said ports.

9. Cooling apparatus according to claim 1 in which the casing of each module has parallel sides so that the sides of adjacent modules lie against each other when attached.

10. Cooling apparatus according claim 1 in which the modules are installed in a roof space or on the roof of a building.

11. Cooling apparatus according to claim 1 in which the modules are mounted on an outside panel of the cabinet.

* * * * *